United States Patent [19]

O'Hare

[11] 4,453,382
[45] Jun. 12, 1984

[54] CONVECTION POWERED SOLAR ENGINE

[76] Inventor: Louis R. O'Hare, 1041 Ponderosa Apt. 2, Fort Collins, Colo. 80521

[21] Appl. No.: 184,205

[22] Filed: Sep. 5, 1980

[51] Int. Cl.$^3$ .............................................. F03G 7/02
[52] U.S. Cl. .................................. 60/641.11; 60/516; 417/379
[58] Field of Search ............. 60/641.8, 641.11, 641.12, 60/516, 530, 531, 641.13, 641.14; 417/379

[56] References Cited

U.S. PATENT DOCUMENTS 1,826,273 10/1931 Christiansen .......................... 60/530
4,148,195 4/1979 Gerstmann et al. .............. 60/516 X
4,207,034 6/1980 Zeimer .............................. 60/531 X

FOREIGN PATENT DOCUMENTS 2440479 7/1980 France ................................. 60/531

Primary Examiner—Allen M. Ostrager
Assistant Examiner—Stephen F. Husar

[57] ABSTRACT

The draft from a solar heated convection column or series of convection columns is used to alternately draw first heated air from a black body solar collector and then to draw cooled air from a heat sink over the walls of a heat exchanger so that the walls of a sealed cavity in the heat exchanger alternately contacting first the hot air draft and then the cool air draft are first heated and then cooled, thereby first heating the sealed gas or vapor within the cavity and then cooling the gas or vapor within the cavity, the consequent pressure changes in the cavity are converted to mechanical energy by action against the interior walls of a large bellows or on a piston in a cylinder the interior walls of which are part of the same sealed heated and cooled cavity.

6 Claims, 8 Drawing Figures

CONVECTION POWERED SOLAR ENGINE

SPECIFICATION

This invention is a type of engine which converts low grade thermal energy into mechanical energy. The utility of such an engine derives from the abundance of readily available thermal energy which has only moderately higher temperature than its surroundings. Since heat engines based on moderate temperature differences generally do not provide thermal efficiency of operation, many low temperature thermal energy resources are neglected as means of providing mechanical energy. Accordingly, the object of this invention is to remidy that neglect by ignoring the traditional requirement for thermodynamic efficiency in an engine and choosing instead a type of engine which is energy cost efficient because it is able to operate on the enormous energy resource contained in abundant moderate temperature heat sources such as solar and geothermal sources.

Another object of this invention is to utilize the low temperature heat sources with a minimum of technical complication in order to provide a simple system of mechanical energy for those who would otherwise not have a system. Since solar energy is a most abundant heat energy source and since it is inexpensively converted to thermal energy in a black box collector, the principal object of this invention is to convert the heat of a black box collector into mechanical energy and energy of motion. This is to be done by producing pressure-volume work by using heat to pressurize a compressible fluid according to a very widely used art. The means of applying and removing the heat and especially the means of transporting the heating medium are novel to engin design. The energy to transport a heat bearing medium, as well as the energy of removing the heat bearing medium is derived in a way that is novel to engines. The lifting energy of a convection column is used to transport both heating and cooling air in order that heat compressible fluid might be expanded and contracted to produce reciprocating action. Since the temperatures from the black box are moderate, the pressures derivable from low temperature heat are also very moderate. Consequently, to achieve a large amount of work from low pressures, the low pressures must be manipulated to effect large forces. This is done by applying the pressure over a large area by having the compressible fluid interact with a large surface. This in turn requires that a large quantity of fluid be heated and cooled in a confined condition so that pressure can build up against the surface that is to be moved under the influence of the pressure. The heat bearing medium heats the confined fluid and later cooling medium cools it with both the heating and cooling taking place through the walls of a heat exchanger. The appropriate pressure changes are accomplished by temperature changes and the unique combination of two thermal effects provided by two different uses of the black box collector in one engine are the source of the engines novelty. The heat from the black box or other low grade thermal source not only provides for thermal compression but it provides the energy and the means of cycling the heat as well.

In a principal embodiment of the basic inventive concept, the surface against which the confined fluid interacts is the interior area of a large bellows. In this interaction the low pressure available from the moderate temperature elevation from solar heating of air in the black box, are summed over a large surface area to provide a large total force acting with power to expand the large bellows against ambient pressure. The bellows and the fluid continue to interact when the cooling of the confined fluid depressurizes it but the interaction is now in the opposite direction as the now greater external ambient pressure retracts the bellows.

While other inventions such as that by Mark Schuman in U.S. Pat. No. 3,827,675 use heating and cooling of compressible fluid to expand and contract a bellows, nevertheless, it is not done in that invention for purposes of mechanical power extraction, nor to provide a means of energy conversion using low grade heat for mechanical energy production. In that invention, even while high grade heat from an electric resistance heater is being applied to the confined compressible fluid in a cavity in fluid flow relationship with a bellows, the bellows itself is being cooled to enhance fluid flow to the bellows. The heating and cooling periods overlap in a thermal lag to effect a better flow of fluid between the bellows and the heat exchanger. This is quite different from expanding the bellows with a unique method of heat delivery to extract mechanical energy from a low grade energy source. Also in my previous solar energy converter U.S. Pat. No. 4,179,893 bellows are used to provide mechanical work energy from low grade work energy. However, in that invention work energy is extracted from the expanding bellows to move air for heating into a solar collector. In this present invention on the contrary the energy to move the heating medium comes not from the physical force of an expanding bellows but from the motive force of convecting hot air. Further there is a very close similarity between my copending application called, "Hybrid Solar Engine" and this present invention. In that application an entirely separate power source is used to transport the heat transferring medium. The power source for heat transport in that application is not convection but rotating blowers powered principally by photogenerated electricity.

In another embodiment of the concept of this present invention, the surface against which the confined, compressible fluid interacts is the surface of a column of water. Water in an enclosed pumping tank is propelled through an exit check valve under the influence of heat pressurized air acting on the water column. Subsequent redirecting of heat energy by the draft from the convection column cools and depressurizes the heat pressurized air acting on the water column thereby allowing ambient air pressure acting on water outside the pumping tank to move water into the tank through an inlet check valve.

This engine is the result of a unique combination of convection current dynamics with heat pressurization action to provide a reciprocation action and in other embodiments rotary motion is provided from the slow reciprocation of the engine.

Clarification of the use of convection column draft to heat and cool compressible fluid for a pressure interaction against a movable surface to create reciprocating movement and rotary energy may be had by referring to the drawings.

FIG. 1 of the drawings shows a bellows which will expand when ambient pressure warm air is drawn through it and which will contract when ambient pressure cool air is drawn through it.

Figure 1:
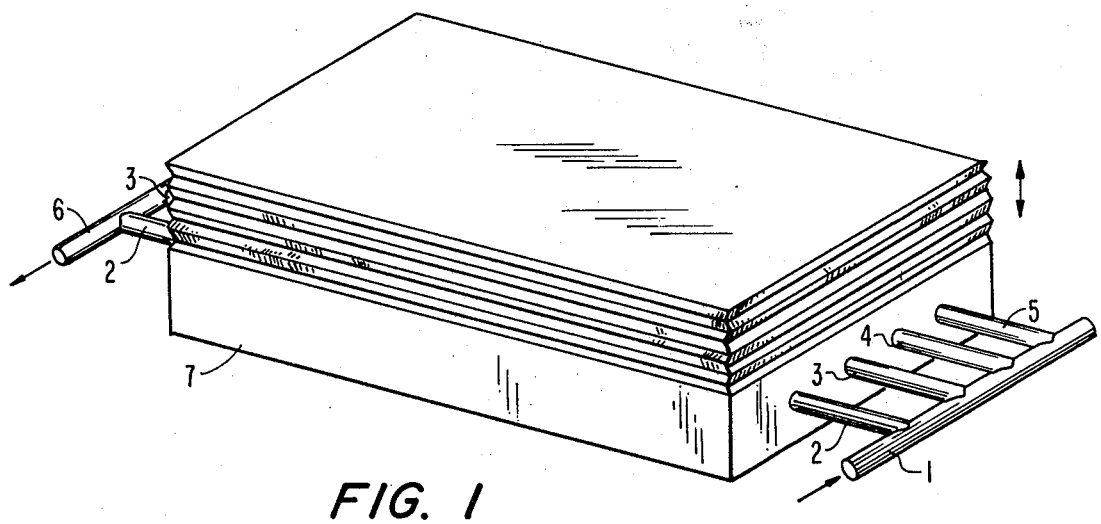

referring then to FIG. 1 of the drawings, warm air entering intake manifold 1 moves through tubes 2, 3, 4 and 5 heating these tubes which are sealed to the sides of bellows box 7 to prevent any of the air within 7 from leaking out since 7 is sealed against all outside air as well as against any air from the tubes 2, 3, 4 and 5. These tubes exit the air they carry from 1 into exit manifold 6 and they warm the interior air in 7 causing bellows top 8 to elevate as the bellows expands. Subsequent drawings will show that when exit manifold 6 is connected to the intake or inlet of a convection column the draft from the column draws air from 6 and draws air into 1 so that when 1 is connected to a solar collector then hot air from the collector is drawn from 1 to 6 heating the bellows and expanding it.

Figure 2:
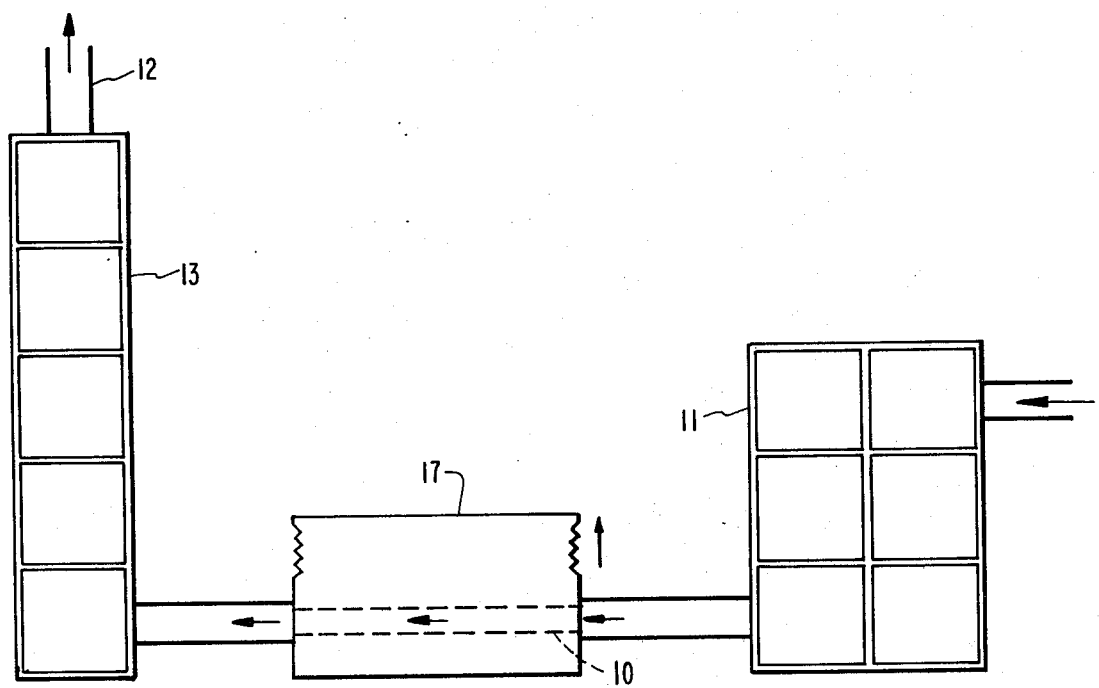
FIG. 2 shows a way in which warm air may be drawn through a bellows using a convection column.

Referring then to FIG. 2 of the drawings, bellows 17 has a heater tube 10 passing through it to carry solar heated air from black box collector 11 to convection column 12 in which the rising heated air from convection heater-collector 13 creates a draft which draws air from collector 11 through 10 and up 12. The convection heater-collector is a solar black box collector in the principal embodiment and it heats the convection tube. There is an inlet to the convection tube in the bottom and an exit on the top. The convection tube may be in the form of a channel in the airspace behind the glass and in front of the black surface of the collector or it may be a separate enclosed space behind the black body absorber and contacting the absorber to receive heat from it. While in the principal embodiment the convection column 12 is heated by a black box solar collector, it is understood that any sorce of heat in contact with the verticle passage of 12 would heat the air within it and cause it to rise thereby producing a draft which will draw hot air from 11. In this way a thermal mass of rocks encircling convection tube 12 but heated at an earlier period by solar or other methods would continue convection when solar was not available. A water jacket around 12 containing hot water would perform the same function and the water might be heated by geothermal or other sources such as industrial waste heat. Similarily, the hot air drawn through tube 10 from the black box collector 11 may be drawn from other heat sources such as from a solar heated rock storage area or geothermal etc.

Figure 3:
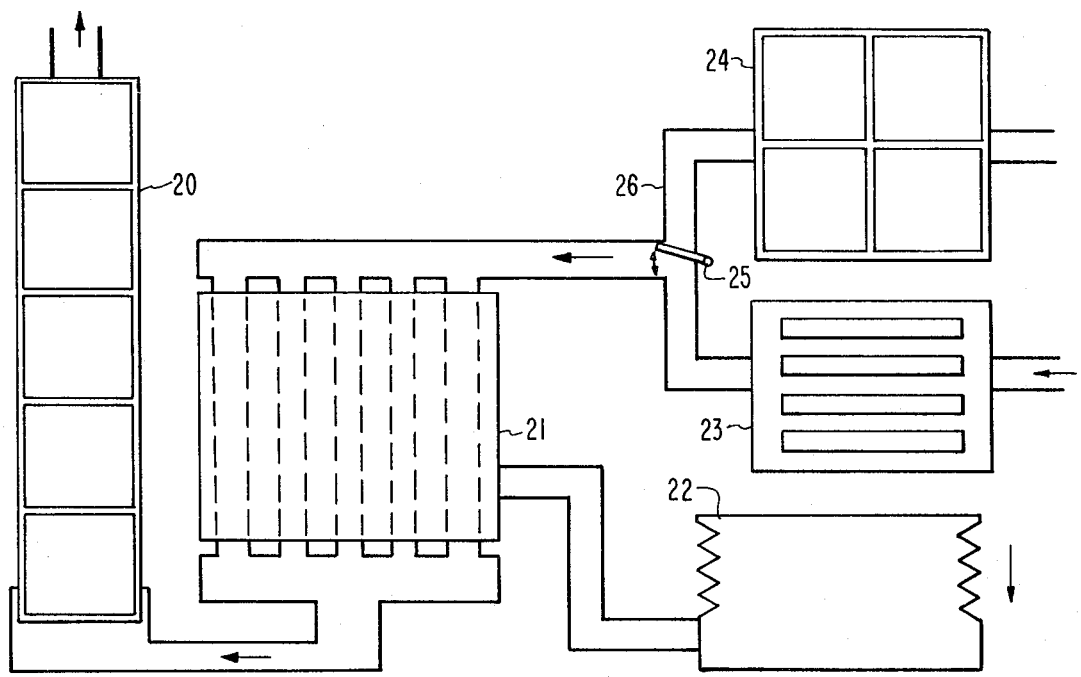
FIG. 3 shows how a bellows may be expanded and contracted using a convection column to move both hot and cool air.

Referring then to FIG. 3, a solar black box collector 20 which is long and narrow in shape is positioned so that the length of its rectangular shape rises vertically with the effect that the solar heated air rises within it to form a convection column. Openings on both the bottom and on the top of 20 allow a circulation of air through it, the air being drawn on the bottom and exhausted on the top. This convecting black box collector 20 draws in air from heat exchanger 21 at approximately ambient pressure. The heat exchanger 21 has within it a sealed chamber which is sealed except for a fluid flow connection with the interior of a bellows 22, thereby the heat exchanger chamber and bellows 22 being joined to form one cavity which is heated and cooled by tubes passing through the heat exchanger but which cavity does not communicate in fluid flow relationship with the air passing through the tubes of the heat exchanger. The air drawn through the tubes of the heat exchanger 21 by convecting collector 20 is received into the exchanger from either air cooler 23 or from heater solar collector 24 depending upon the position of valve 25. This valve has only two possible positions and no intermediate positions. In the position shown the valve 25 blocks air from the heater and receives air from the cooler. The draft from 20 thereby draws cool air through 21 cooling the chamber within it and decompressing the fluid pressure in the cavity of which the interior of 22 is part. This contracts bellows 22. When 25 is in its alternate position, hot air is admitted from 24 to 21 thereby pressurizing its chamber and the cavity of which 22 is part, thereby expanding 22 to provide mechanical work energy. Air cooler 23 is an array of interconnected, air conducting tubes located in a cool place. The array admits ambient air through an opening at one end and cools it. The cooled air is drawn into the system from another opening on its other side. In an embodiment of the invention for its use where ambient air is cool 23 is omitted and ambient air is drawn in through the duct that would otherwise connect to the cooler. The heat source for the convection column 20 is shown as a verticle solar collector. In other embodiments the verticle convection passage may be heated by contact with a heated thermal mass of rocks or by a water jacket of heated water around the convection tube. In this case 20 would represent heated thermal mass. But in the principal embodiment 20 is a directly heated solar collector convection column. Heat that is drawn from 24 may likewise by drawn from other sources according to other embodiments of the basic inventive concept. These sources are described in FIG. 2 and they are to be located at the position of 24 and to be used in place of the solar collector or in addition to it. But in the principal embodiment 24 is a solar black box collector.

Figure 4:
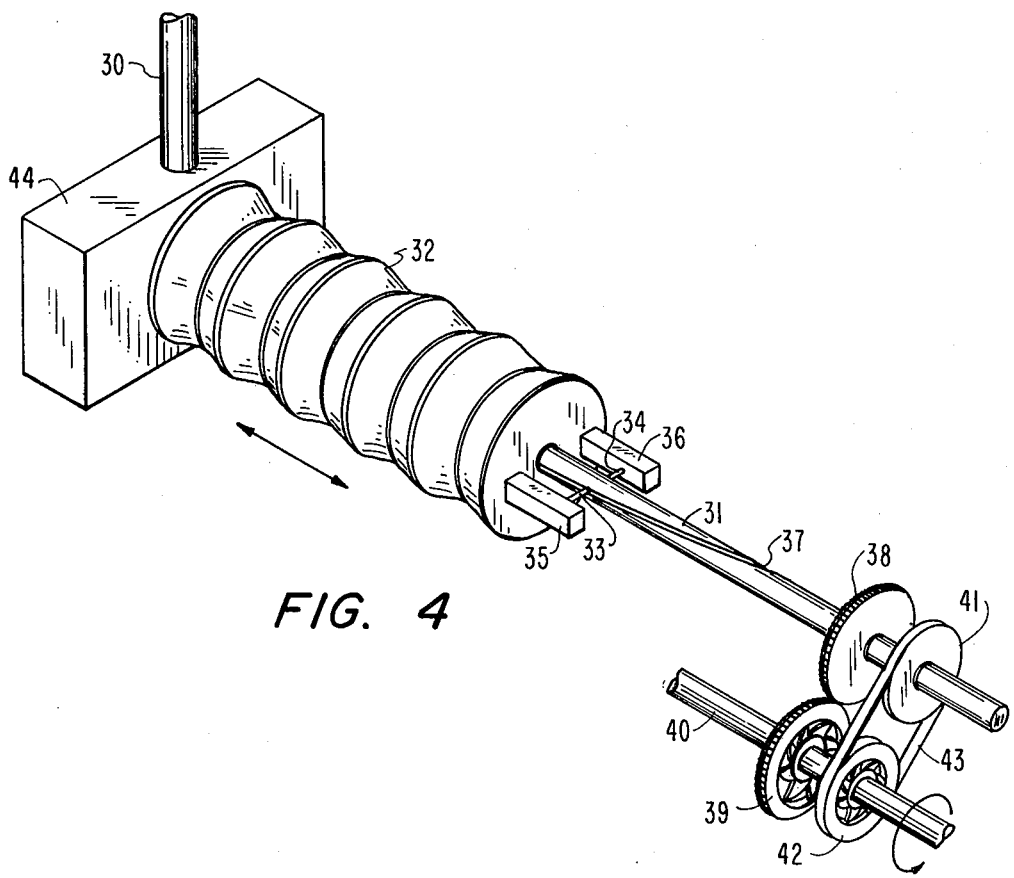
FIG. 4 shows how rotational energy may be derived from an expanding-contracting bellows.
Figure 5:
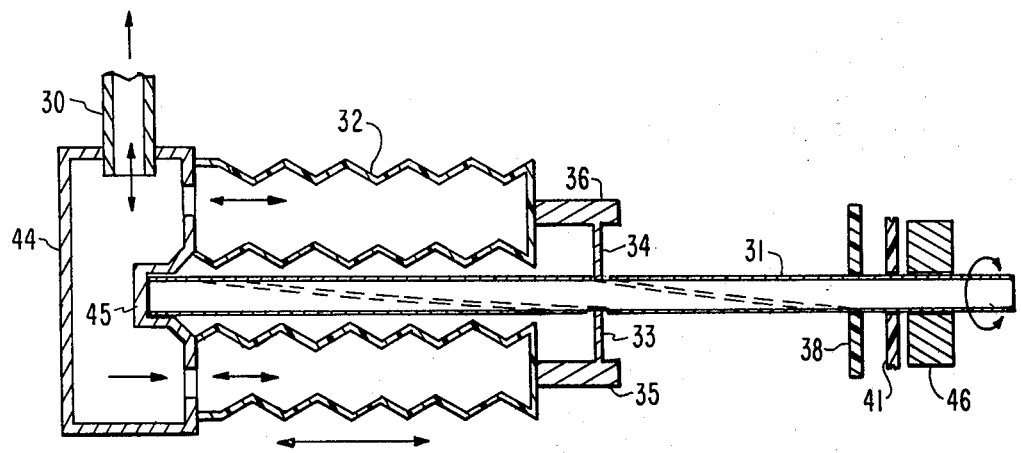
FIG. 5 is a cross sectional view of a bellows used for rotary motion.
Figure 6:
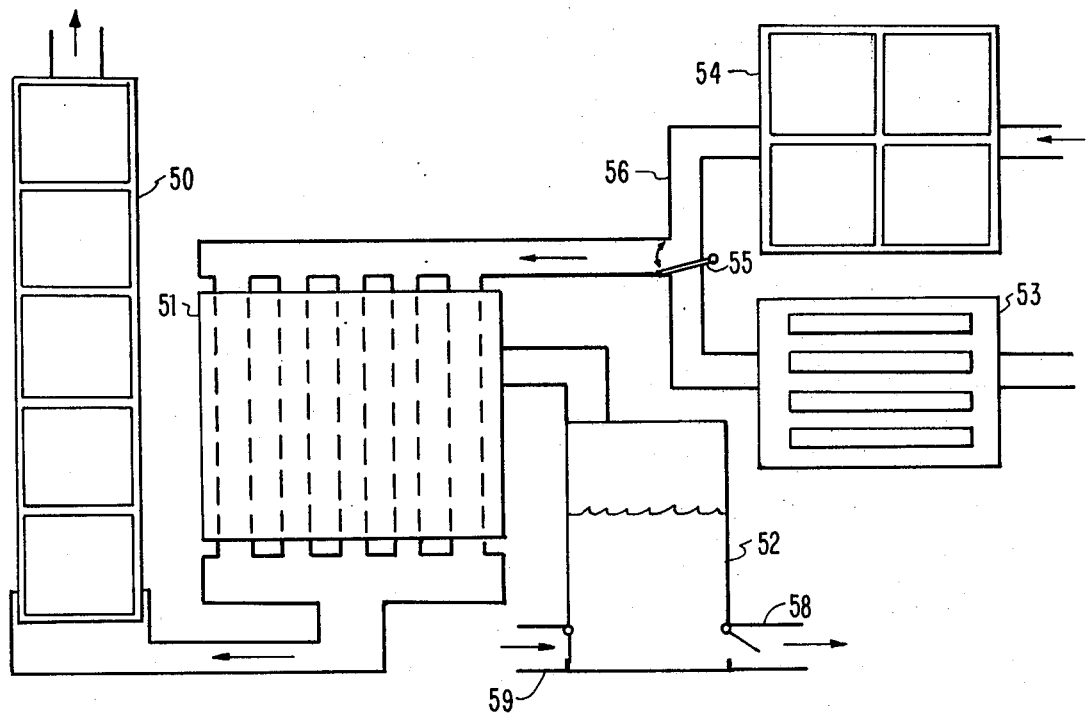
FIG. 6 is a diagram of a water pump powered by a convection column and a solar collector.

Finally, in this FIG. 3, the bellows 22 may be replaced by the bellows mechanism of FIG. 4 and FIG. 5 or it can be replaced by the pumping tank described in FIG. 6. Referring then to FIG. 4, the bellows 32 is expanded and contracted by the changing pressures in the chamber of exchanger 21 of FIG. 3. Tube 30 in FIG. 4 connects to 21 of FIG. 3. In FIG. 4 then, when 32 expands, it causes shaft 31 to rotate in a counterclockwise direction. When it contracts, 31 rotates in a clockwise direction. This is caused by the action of sliders 33 and 34 following in the spiral slot on 31 as the bellows moves parallel to the length of 31. The sliders are supported on the bellows which cannot rotate by supports 35 and 36. The slider 33 follows in slot 37. When shaft 31 and gear 38 rotate in a clockwise direction ratcheting gear 39 rotates in a counterclockwise direction to drive output shaft 40 in a counterclockwise direction. When shaft 31 and gear 38 rotate in a counterclockwise direction, ratcheting gear 39 ratchets with its outer circumference rotating clockwise but it does not drive shaft 40 at its hub nor is the outer part of 39 driven by 40. When pulley 41 is rotated by shaft 31 in a clockwise direction it turns ratcheting pulley 42 but 42 ratchets and does not drive shaft 40 in a clockwise direction. However, when 41 counterrotates 42 does not slip on its ratchets but by means of belt 43 pulley 41 drives 42 and shaft 40 in a counterclockwise direction. In this manner the reciprocating movement of 32 provides unidirectional rotation. Plenum 44 delivers changing fluid pressure to bellows 32.

Referring then to FIG. 5, a cross sectional view of the kind of bellows shown in FIG. 4 is shown in order to clarify the internal structure of bellows 32. Accordingly, it can be seen that 32 is donut shaped and on its interior it forms one cavity with its plenum and duct 30 whereby it becomes integrated with the chamber of 21 of FIG. 3 to receive pressure changes from it. Shaft 31 rotates in bearing 45 which is outside the cavity of the bellows 32. Sliders 33 and 34 with their supports 35 and 36 are the same as in FIG. 4. Gear 38 and pulley 41 are also the same as in FIG. 4. Bearing 46 supports 31. While the plenum 44 supports the bellows and directs to it the compressible fluid having changing pressures which expand and contract the bellows.

Referring to FIG. 6, the solar black box collector constructed to produce a convection current within is 50 and corresponds to convecting collector 20 of FIG. 3. The heat exchanger 51 is the same as the exchanger 21 of FIG. 3 except that the external connection of 51 connects to a water pumping tank 52 whereas the corresponding connection on exchanger 21 of FIG. 3 connects to bellows 22. In this FIG. 6 the heat exchanger's sealed chamber is in fluid flow relationship with water pumping tank 52 so that the heating and cooling of the heat exchanger's chamber will produce pressure changes over the water column in 52. The convection current moving up 50 draws either hot air from solar heater collector 54 when valve 55 is in its present position or 50 draws cool air from cooler 53 when valve 55 is in its alternate position blocking duct 56. The alternating hot and cool air drawn from 54 and 53 respectively are drawn through the tubes of heat exchanger 51 alternately heating and cooling its chamber to pressurize and then depressurize the fluid in its chamber and over the water column in 52. During the periods of pressure in 52 water is expelled through check valve 58, and during periods of depressurization water is drawn into 52 through intake check valve 59. Cooler 53 is an array of interconnected, air conducting tubes in a cool place.

Figure 7:
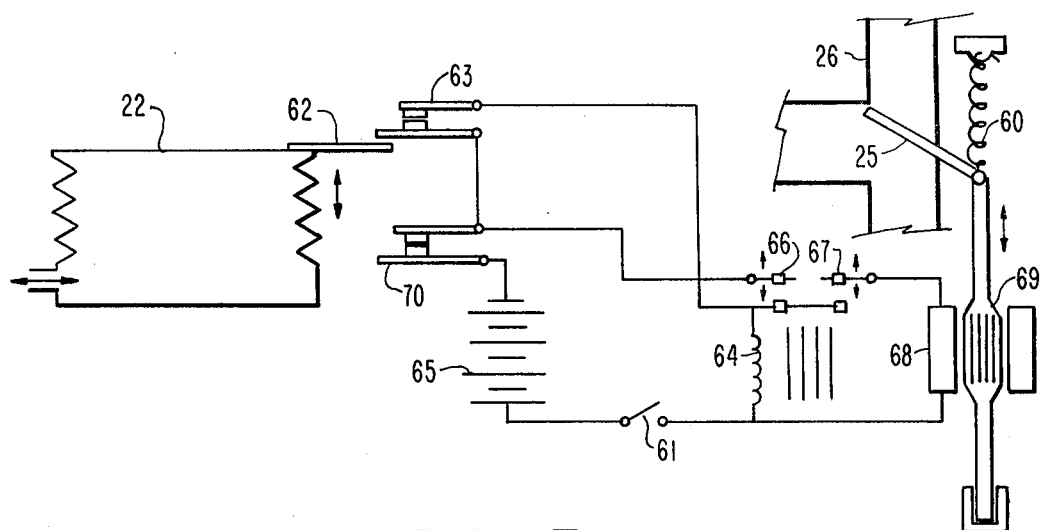
FIG. 7 is a diagram of an automatic control of heating and cooling for bellows operation.

Referring then to FIG. 7, the valve 25, which is the same as the valve 25 of FIG. 3 and corresponds to 55 of FIG. 6, may be operated manually by moving it to close off hot air flow from the heater collector when the bellows has expanded thereby admitting cool air. Likewise in manual operation the duct 26 being the same as duct 26 of FIG. 3 and corresponding to duct 56 of FIG. 6 may be opened to stop cooling and admit heat when the bellows has contracted. This operation may be accomplished automatically as well according to the diagram of this FIG. 7. The spring 60 holds the lever of valve 26 in an up position keeping valve 25 down and admitting hot air to heat and expand the bellows 22 according to the mechanism of FIG. 3. When the automatic control switch of this FIG. 7 is closed and after 22 has expanded by the heating, then contact arm 62 contacts and closes points 63 which are normally open. This closure completes the current flow from battery 65 through relay 64 closing its double set of contacts 66 and 67. The contacts 66 are in parallel with 63 and the relay 64 holds itself in a conducting condition, that is to say the relay is electrically latched and in this condition points 67 remain in contact continuoeing a current flow to solenoid 68 which magnetically draws and holds its plunger 69 in a downward position to thereby move valve 25 to close duct 26 closing off hot air flow and open a cool air passage. The cooling that results contracts 22 from its expanded condition until it is so contracted that contact arm 62 engages normally closed contacts 70 and opens them breaking the circuit to 64 and causing it to release its pull on its contacts. Those contacts open and, since 63 is open the circuit to 68 is open. This releases 69 to the upward pull of 60 and 25 is pivoted to open duct 26 to admit hot air for more heating. The heating again continues until 22 again expands sufficiently to for 62 to close 63 and the cycle continues as before. For clarity of description 22 is depicted as a simple bellows but it is understood to also represent bellows 32 of FIGS. 4 and 5 as well because a contact arm represented by 62 may be attached to the end of any bellows to control its expansion and contraction by operating contacts as 63 and 70 in the circuit of FIG. 7. When float switches are substituted for 63 and 70, this circuit of FIG. 7 provides the controlling means for pressurizing and depressurizing the water pumping tank of FIG. 6. The placement of the float switches which replace contacts 63 and 70 is shown in the following FIG. 8.

Figure 8:
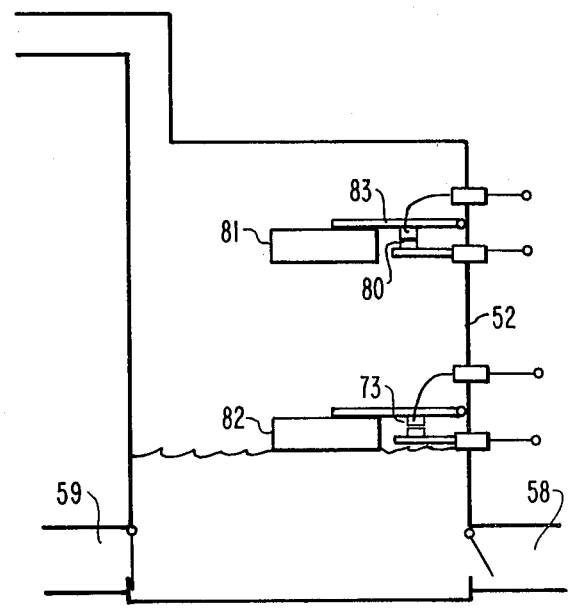
FIG. 8 shows float switches to be used with the automatic control circuit to operate the water pumping tank described in FIG. 6.

In FIG. 8 then, contacts 73, normally open when there is water in the tank, replace the contacts 63 of FIG. 7. Just as contacts 63 close in a condition of maximum pressure when a bellows is fully expanded so when maximum pressure has expelled water from the pumping tank 52 then float 82 drops and 82 make contact to initiate a cooling cycle. Contacts 80 substitute for contacts 70 of FIG. 7 when the circuit of FIG. 7 is used to control pressurizations in the water pumping tank of FIG. 6. Both contacts 70 of FIG. 7 and 80 of FIG. 8 are normally closed and they open only in the condition of minimum pressure. Points 80 are normally closed because of the weight of float 81 until at a condition of minimum pressure water drawn in through check valve 59 lifts float 81 on pivot arm 83 opening contacts 80. When contacts 80 are opened because the tank is full, then solenoid 68 of FIG. 7 is deenergized and valve 25 opens duct 26 to begin a heating and pressurization cycle which will expel water through valve 58.

In the various embodiments of the basic inventive concept reciprocating energy is taken directly from the expanding-contracting bellows according to any conventional practice of the art such as with a walking beam operating a reciprocating pump or a levering ratchet lifting a hoist. These are not shown because they are well known in the current art or, in another embodiment, rotational energy is provided by the invention and in other embodiments either manual operation is available by manually cycling the air flow control valve, such as valve 25 of FIG. 3, to admit cool air when the bellows is expanded and to admit hot air when it is contracted or automatic operation is used in another embodiment. In yet another embodiment this system of moving heat changes into pressure changes provides a manually controlled water pumping device by manually moving the air flow control valve such as valve 55 of FIG. 6 to the position to admit hot air to the exchanger when there is sufficient water in the pumping tank and then manually repositioning the valve to admit cool air from the cooler after water has been expelled from the tank. In another embodiment the water pumping tank is operated automatically. While FIG. 3 and FIG. 6 describe the use of coolers 23 and 53 respectively, nevertheless in other embodiments these coolers are omitted and cool ambient air is taken in through the ducts that would otherwise lead to the coolers.

I claim:

1. A thermal energy to mechanical energy converter comprising:
    (1) a thermal energy to heated air conversion means by which air is drawn over a quantity of material containing thermal energy,
    (2) and an air cooling means providing a source of cooling air and being in the form of ducting with cooling fins located in a cool place and
    (3) a heat exchanging and fluid pressurizing means in the form of a sealed cavity containing a fluid such as air, said cavity being capable of repeated heating and cooling by alternate flows of first heated and then cooled air being drawn through ducting extending through said cavity and with said cavity being capable of pressurization during the heating periods by the thermal expansion of the heated fluid within the cavity and said cavity also being capable of depressurization during said cooling periods by the contraction of the cavity fluid, and
    (4) an intermittent thermal energy cycling means in the form of a convection column heated by contact with a quantity of material containing thermal energy, said column being thereby capable of heating the air within its internal cavity and by causing the heated air to rise within to provide a draft at the base of said column, and said column being in series fluid flow communcation by means of valving first with said heat exchanging means and with the thermal energy to heated air conversion means and then in a second period with said heat exchanging means and said air cooling means, said energy cycling means thereby being capable of providing alternate drafts of air first from said thermal energy to heated air conversion means into said heat exchanging means and then secondly from said cooling means to said heat exchanging means, and
    (5) a fluid pressure to mechanical energy conversion means by which the pressurizations and depressurizations effected by the respective heating and cooling of the fluid within said cavity are connected by ducting to an expandable cavity in which said pressurizations and depressurizations interact against a moveable surface to move the surface in one direction under pressurization and in the opposite direction under depressurization.

2. A solar energy to mechanical energy converter comprising:
    (1) a solar energy to thermal energy conversion means changing solar radiation to hot air in the form of a solar black box collector, and
    (2) an air cooling means providing a source of cooling air and being in the form of ducting with cooling fins located in a cool place and
    (3) a heat exchanging and fluid pressurizing means in the form of a sealed cavity containing a fluid such as air, said cavity being capable of repeated heating and cooling by alternate flows of first heated and then cooled air being drawn through ducting extending through said cavity and with said cavity being capable of pressurization during the heating periods by the thermal expansion of the heated fluid within the cavity and said cavity also being capable of depressurization during said cooling periods by the contraction of the cavity fluid, and
    (4) an intermittent thermal energy cycling means in the form of a solar black box collector convection column capable of heating the air within its internal cavity and by causing the heated air to rise within to provide a draft at the base of said column, and said column being alternately in series fluidflow communication by means of valving first with said heat exchanging means and the solar to thermal energy conversion means and then in a second period with said heat exchanging means and said air cooling means and being capable of providing alternate drafts of air first from said solar to thermal conversion means to said heat exchanging means and secondly from said cooling means to said heat exchanging means, and
    (5) a fluid pressure to mechanical energy conversion means by which the pressurizations and depressurizations effected by the respective heating and cooling of the fluid within said cavity are connected by ducting to an expandable cavity in which said pressurizations and depressurizations interact against a moveable surface to move the surface in one direction under pressurization and in the opposite direction under depressurization.

3. A solar energy to mechanical energy converter as in claim 1 in which the pressure to mechanical energy conversion means and the heat exchanging and fluid pressurizing means is a bellows with a heat exchanging cavity inside containing a fluid such as air, and the whole interior area of which cavity is heated and cooled first by heated air, then by cooled air circulated in tubes extending through the sides of the bellows but sealed to the sides of the bellows to prevent leakage and to isolate the heating-cooling fluid in the tubes from the air in the cavity of the bellows, said tubes being connected and positioned centrally in a series fluid flow communication which alternates by means of valving between, firstly, said solar black box collector convection column on its downstream side and said thermal conversion means on its upstream side and, secondly, between said solar convection column on its downstream side and said cooling means on its upstream side, said bellows thereby being capable of expanding by thermal pressurization when said fluid in its cavity is heated by hot air in its tubes and then of contracting when fluid in its cavity is contracted by being cooled by the subsequent periodic cool air in its tubes.

4. A solar energy to mechanical energy converter as in claim 1 in which the pressure to mechanical energy conversion means is a large bellows the interior of which is made part of said sealed cavity of the heat exchanger by means of ducting connecting the two, the bellows thereby expanding and contracting in response to heat pressurization and to cooling depressuration to provide mechanical work energy.

5. A solar energy to mechanical energy converter as in claim 1 in which the pressure to mechanical energy converter is a large toroid-shaped bellows, the internal cavity of which is in fluid flow communication with said pressurization means, said bellows having within the enclosure of its central hole a notched shaft supported on either end by bearings in order to rotate about its axis, the circumference of this first shaft being in the same plane as the circumference of the bellows, the circular notches of this first shaft winding along the shaft after the manner of threads on a screw so that as the bellows, which is itself unable to rotate, expands lengthwise along the shaft certain followers on the bellows engaged in the threadlike knotches on the shaft cause the shaft to rotate about its axis in one direction and similarily to rotate in the opposite direction when the bellows later contracts thereby producing alternate rotations first in one direction then in another with said alternating rotations being translated into unidirectional rotations by a gear connected to said first shaft driving a ratcheting gear which turns a second parallel shaft in only one direction and by a pulley connected to the first shaft turning a belt to drive a ratcheting pulley to turn a second ratcheting pulley which turns the second shaft in only one direction, which is the direction the ratcheting gear turns the same second shaft thereby providing unidirectional output drive rotation on the second shaft.

6. A converter as in claim 1 in which the pressure to mechanical energy conversion means by which the pressurizations and depressurizations effected by the respective heating and cooling of air interact with a moveable surface is a water pumping tank enclosed except for inlet and exit check valves and having a column of water against the surface of which the pressurizations act to expell the water from the tank through the exit check valve and also against the surface of which water the depressurizations interact to draw water through the inlet check valve into the pumping tank.

* * * * *